Jan. 23, 1940. E. J. HOUDRY 2,187,741
TREATMENT OF HEAVY HYDROCARBON MATERIAL
Filed Jan. 15, 1936

INVENTOR
EUGENE J. HOUDRY
BY
Ira L. Nickerson
ATTORNEY

Patented Jan. 23, 1940

2,187,741

UNITED STATES PATENT OFFICE 2,187,741

TREATMENT OF HEAVY HYDROCARBON MATERIAL

Eugene J. Houdry, Rosemont, Pa., assignor to Houdry Process Corporation, Dover, Del., a corporation of Delaware Application January 15, 1936, Serial No. 59,264

10 Claims. (Cl. 196—52)

This invention relates to the treatment of heavy hydrocarbons including residues of hydrocarbon material such as those derived from petroleum, shale oil, bituminous distillates, etc. More particularly it concerns the removal therefrom of ash, tar, asphalt, coke, resinous matter and materials which easily form asphalt or coke. These materials are highly deleterious and objectionable in the conversion of such hydrocarbons into valuable lighter hydrocarbons including motor fuels, burning oils and other distillates, such as Diesel oil and domestic fuel oil. In certain respects, the present invention may be considered as a modification or further development of and improvement over the invention disclosed in my copending application entitled "Treatment of hydrocarbon residues," filed November 27, 1935, and bearing Serial No. 51,770.

One object of the invention is to remove objectional components from heavy hydrocarbons comprising or containing bottoms so as to produce a clean or substantially clean material which is suitable for use as a charging stock for cracking or other converting or transforming operations. Another object is to present the clean material in vapor phase. Still another object is to recover valuable substances which may be present in the original material. A still further object is to devise simple and efficient apparatus for accomplishing the above objects. Other objects will be apparent from the detailed description which follows.

The invention involves passing a stream of heated and partially vaporized charging material of the general class described through confined separating and filtering zones capable of effecting removal and retention of the undesirable components. By preference, a stream of the hydrocarbon residue or charge, admixed or not with an inert fluid, is heated to a temperature sufficiently high to vaporize a substantial proportion of it. The resulting stream of mixed hydrocarbon vapors and unvaporized material is admitted to a primary separation zone in which a portion of the unvaporized material is separated from the vapors and withdrawn from the zone as a tar or bottoms fraction. The overhead or substantially vaporous fraction comprising a mixture of vapors and entrained, finely divided liquids and solids is sent to a second separation or filtering zone which includes a bed or layer of a suitable contact mass. In this zone the entrained liquids and solids are retained on or in the contact mass and the vapors are permitted to pass therethrough. Such vapors when condensed provide valuable liquid or distillate materials which are substantially free of ash, tar, coke and like undesirable material.

The contact mass is preferably capable of being regenerated or reactivated from time to time, as by combustion to remove therefrom carbonaceous and other burnable deposits, and, at suitable intervals, by a solvent or leaching solution to remove therefrom deposits of ash which accumulate thereon, for example, after the manner disclosed and claimed in my U. S. Patent No. 1,957,649, issued May 8, 1934. To provide for continuous production of treated material, two or more filtering zones are provided, one or more of which can be regenerated while the other or others are in use.

In order to illustrate the invention concrete embodiments thereof are shown in the accompanying drawing, in which.

Figure 1:
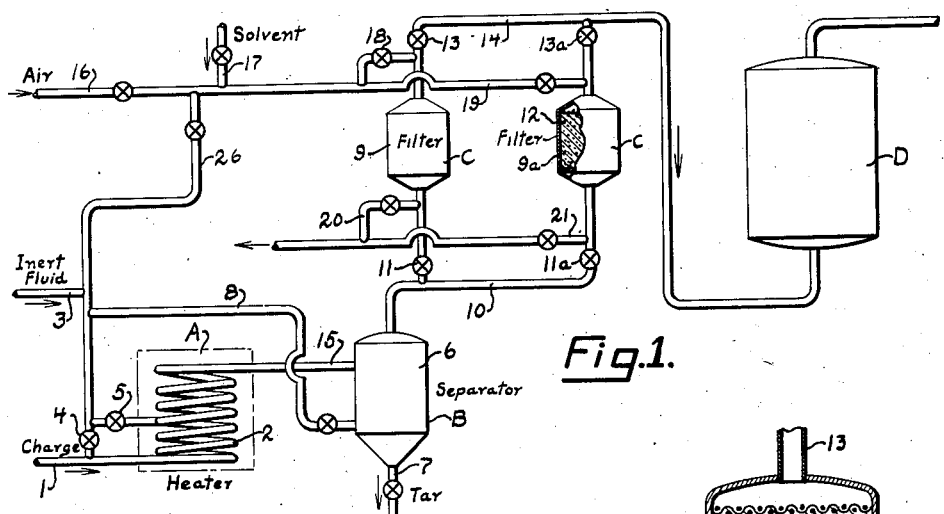
Fig. 1 is an elevational view somewhat diagrammatic in character and showing at least one part in vertical section.
Figure 3:
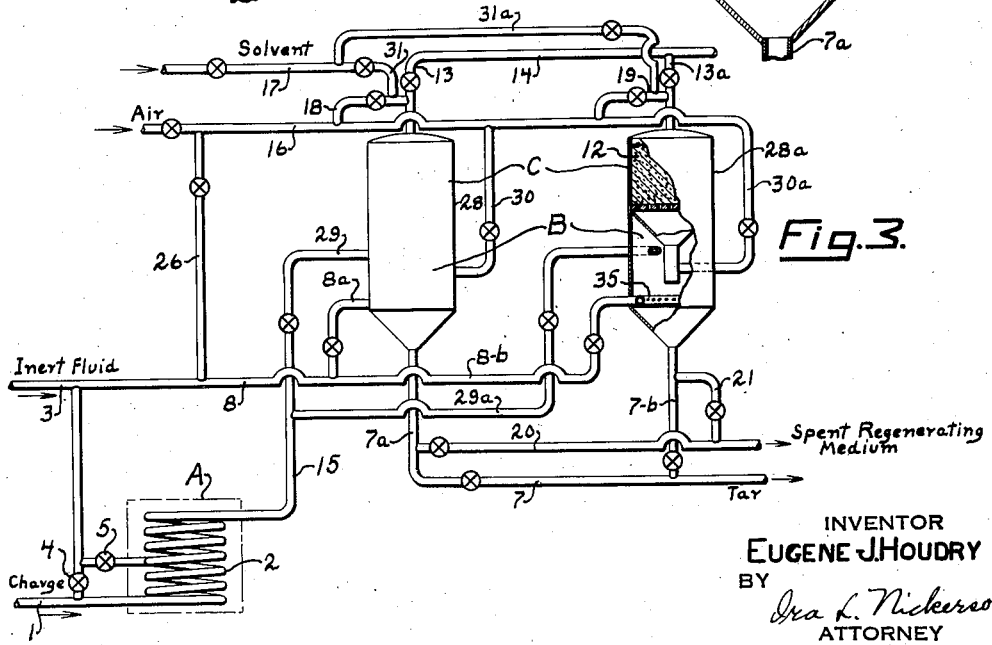
Fig. 3 is an elevational view, somewhat diagrammatic in character, with some parts shown in section, illustrating a modified form of the arrangement shown in Fig. 1.

Referring to the drawing and particularly to Figs. 1 and 3, the hydrocarbon charge is fed to heating zone A containing a conduit coil 2 wherein it is heated to a temperature sufficiently high to effect vaporization of a substantial proportion thereof but preferably to a temperature below that at which a substantial amount of conversion of the charge to lower boiling hydrocarbons is effected. The heated and partially vaporized charge is conveyed by line 15 and preferably without substantial reduction of pressure from heating zone A to primary separation zone B in which any desirable proportion of the unvaporized charge is thrown down as a tar or bottoms fraction which is withdrawn from the zone by valved line 7 in Fig. 1, or by valved lines 7a or 7b in Fig. 3. The overhead or substantially vaporous fraction is conducted from primary separation zone B to the second separation or filtering zone C containing a bed or layer of contact material 12 capable of retaining the unvaporized material entrained in the hydrocarbon vapors, thus permitting clean and dry hydrocarbon vapors to leave filtering zone C. These vapors are suitable for charge to any desired conversion or treating zone, such as indicated at D in Fig. 1. Contact mass 12 may be non-catalytic in character or it may assist or promote to a limited extent the treatment or conversion of hydrocarbons. Contact masses suitable for use in separation zone C include non-porous thread-like materials, such as mineral wool or glass wool and/or fragmentary or molded pieces of porous material such as silica gel, diatomaceous earth, pottery, firebrick, kaolin, or other catalytically active or substantially inert hydrosilicates of alumina, of natural or artificial origin, as for example, the catalyst carrier disclosed in United States Patent No. 1,818,403, issued August 11, 1931, to Alfred Joseph. If necessary or desired, heat in addition to that contained in the stream of material entering zone C may be added to that zone in any desired or known manner.

It is usually preferable to utilize an inert fluid such as steam or normally gaseous hydrocarbons to assist in the vaporization of the charge and/or to restrict conversion thereof into lower boiling hydrocarbons of the motor fuel range. Such inert fluid is supplied by line 3 and may be admixed with the charge before the latter enters heating zone A, as by valved line 4, or while the charge is being heated, as by valved line 5 connected to coil 2. Additional inert fluid may be added in the primary separation zone B as by valved line 8. Inert fluid for assisting in cleaning the contact or filtering material, as for example, for purging the contact mass prior to regeneration by combustion or after a regeneration by solvent extraction, is supplied by valved line 26.

The completeness of the separation of unvaporized material from vapors in separation zone B can be controlled by regulating the velocity of the fluid stream traversing the zone and by regulating the amount of inert fluid entering the zone by valved line 8. The lower the velocity and the greater the amount of steam the better is the separation effected and vice versa.

Referring more particularly to Fig. 1, two filtering zones C indicated by vessels or contact mass containers 9 and 9a respectively, are selectively connected to a primary separation zone B, such as tar separator 6, by means of trunk line 10 and valved branches 11 and 11a. The containers 9 and 9a are selectively connected to trunk line 14 and conversion zone D by valved lines 13 and 13a. Vessels 9 and 9a are provided with the necessary connections for selectively regenerating one while the other one is engaged in the filtering operation. To this end, a regenerating medium, such as air for effecting combustion of burnable materials deposited on contact mass 12, may be supplied to vessel 9 or vessel 9a by means of supply line 16 and valved branch 18 or valved branch 19.

From time to time it becomes necessary or desirable to remove the unburnable material or ash which accumulates on contact mass 12. To this end, a suitable solvent is supplied by valved line 17 and follows the same course as air supplied by valved line 16. The spent regenerating medium, such as fumes of combustion or spent solvent, whichever the case may be, leaves vessels 9 or 9a by valved lines 20 or 21. The spent solvent is a source for the recovery of valuable materials contained in the solid material or ash such, for example, as vanadium, nickel, aluminum, gold and other materials, which are known to be contained in certain petroleum oils, including crudes found in certain districts of South America, Mexico or the United States.

Figure 2:
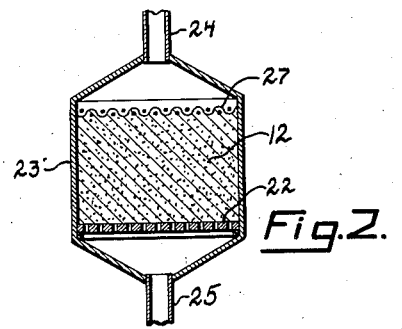
Fig. 2 is a vertical sectional view, on a somewhat enlarged scale, of one of the filtering zones shown in Fig. 1.

The filtering vessel 9 or 9a of Fig. 1 is shown in detail in Fig. 2. This vessel comprises a shell 5 23 provided with inlet and outlet connections 24 and 25. A perforated partition or grid 22 supports contact or filtering mass 12 which is held in place by a grid or screen 27.

In Fig. 3, separation zones B and C are shown in contiguity within a single vessel, such as 28 and 28a. These vessels are selectively connected to heating zone A by transfer line 15 and valved branches 29 and 29a. When it is desirable to clean or regenerate the contact mass in filtering zone C, the charge is switched from one vessel to the other, as from 28a to 28, and regeneration of the contact mass 12 in 12a is effected. In addition to the regeneration and steam connections provided in Fig. 1, Fig. 3 provides additional valved branches 30 and 30a from air supply line 16. By means of these connections, controlled amounts of air can be admitted to the hydrocarbon material leaving the primary zone B for effecting combustion of a portion of this material so as to supply heat to the charge. Thus the clean, dry hydrocarbon vapors leaving zone C may be at any desirable elevated temperature, as for example, at a temperature suitable for effecting pyrolytic or catalytic conversion thereof into lower boiling hydrocarbons. Vessels 28 and 28a may also be selectively connected by means of valved lines 8a and 8b to the source of inert fluid indicated at 3. These vessels are provided with tar drains 7a and 7b selectively connected to tar main 7. Solvent material provided by supply line 17 is admitted when desired to vessels 28 and 28a by valved branches 31 and 31a.

Figure 4:
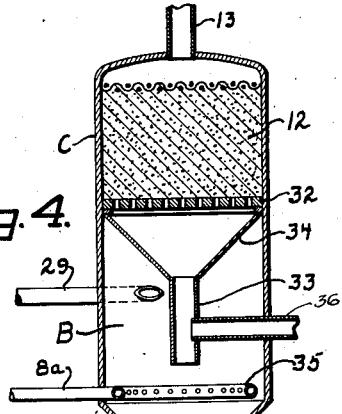
Fig. 4 is an enlarged vertical sectional view of one of the separators shown in Fig. 3.

Vessels 28 and 28a shown in Fig. 3 are illustrated in greater detail in Fig. 4. The interior of the vessel is divided by perforated grid or partition 32 into a lower chamber which provides primary separation zone B and into an upper chamber which provides filtering zone C containing contact mass 12. The primary separation zone is indicated as a centrifugal type of separator. The material enters this zone by line 29 substantially tangentially to the periphery of the separation zone and is thus subjected to a whirling motion to cause a separation of liquid material from the stream of heated charge by centrifugal action. The unvaporized material drops into the lower portion of zone B and is withdrawn through connection 7a, while the substantially vaporous material passes upwardly through riser or conduit 33 and funnel shaped member 34 to pass through partition 32 into contact with mass 12 in filtering zone C and thence out of the vessel through connection 13. A stripping coil 35 supplied with steam or other inert fluid from line 8a is provided in the lower end of zone B to assist in the separation of the heated charge into vaporous and unvaporized fractions. Controlled amounts of air may be admitted to the vapors in riser 33 by connection 36.

The contiguous separation zones, as exemplified in Figs. 3 and 4, present certain advantages over separate zones, as illustrated in Fig. 1. This type of apparatus lends itself more readily to operations where it is desired to have substantial proportions of the unvaporized material traverse separation zone B and enter filtering zone C, since there is less chance for unvaporized hydrocarbons to deposit and accumulate on the walls of connecting conduits, valves, etc. Further, any material which has so deposited during a run or on stream period is removed during a subsequent regeneration.

The rate of feed to filtering zone C in terms of liquid charge per hour can vary from about 75 to 250 times the volume of contact mass 12, i. e. from 75:1 to 250:1. The length of time which contact mass 12 is used before it requires regeneration varies from a few minutes to several hours, as from 10 or 15 minutes to 6 or 8 hours, depending, of course, on the feed rate, the type of contact mass, and the amount and character of material entrained in the vapors entering filtering zone C. The depth of the bed or layer of contact mass 12 may vary from an inch or less to several feet and depends on the type and form of mass used, the type and source of charging stock, the proportionate amount of unvaporized material entrained in the vapors leaving separation zone B, the amount of conversion or transformation of hydrocarbon vapors desired in filtering zone C, and on other variable factors. A good operation usually results from the use of a bed of filtering material which is from 1 inch to 15 inches deep. When the filtering material has some catalytic activity, the tendency is toward a thinner bed than when the material is substantially inert or primarily absorbent in character.

The temperature to which the charging stock is raised in heating zone A may range from 750° F. to 990° F., depending on the nature of the charging stock, on the desired character of the treated products, and on the rate of feed. Temperatures in the higher portions of the range and lower rates are usually desirable when heavy hydrocarbon residues such as tars are run, while charging stocks containing distillates generally require lower temperatures and higher rates. In most cases, temperatures of 810° F. to 930° F. give a satisfactory operation. Separation zone B is usually operated at a temperature which is 10° F. to 60° F. below the highest temperature of the charge in heating zone A, but it may be maintained at substantially the same temperature as the latter. Separation zone C containing contact mass 12 is generally operated at substantially the same or a slightly lower temperature than zone B. The quantity of steam or other inert fluid fed with the charge to assist vaporization and to minimize thermal cracking in heating zone A and/or added to separation zone B to assist in the separation of tar from the vapor stream usually varies inversely as the temperature and may run from 2 to 60% by weight of the charge; up to 75% of the total inert fluid may be added in zone B. Higher amounts of steam are usually required with the heavier charging stocks, as well as when thermal cracking and viscosity breaking is to be kept to a minimum. Another factor which influences the amount of inert fluid used is the desired apportionment of separation to be effected in each of the separation zones B and C. The amount of liquid or tar withdrawn from separation zone B may vary from substantially no tar to 30 or 35% of the volume of the charge, or even more, the influencing factors being the type of charge used and the proportionate amount of separation effected in separation zone B by controlling the operating conditions.

The selection of operating conditions is exemplified in the following typical operation. The charging material was a blend of heavy residues remaining after distillation of East Texas Coastal and Conroe crude oils. It had an A. P. I. gravity of 22.0° and contained 20.5% of hydrocarbons distillable at 477° F. under 15 mm. of mercury absolute pressure, but no hydrocarbons in the gasoline boiling range. It contained 1.6% of unvaporizable material as measured by the Conradson carbon determination. This charge, mixed with 10% by weight of steam, was admitted to heating zone A wherein its temperature was raised to about 890° F. and was sent to primary separation zone B maintained at a temperature of the order of 860 F. 15% steam by weight of the charge was admitted to zone B and from this zone a tar fraction amounting to 12.23% of the charge was withdrawn. The vapor fraction passed through contact mass 12 comprising a 6½" layer of molded pieces of absorbent but practically inert hydrosilicate of alumina maintained substantially at 860° F. The feed rate to the contact mass 12 was 170:1. After an hour's operation, the feed was stopped and the material leaving the contact mass, when condensed, was found to have an A. P. I. gravity of 26.7% and to contain substantially no gasoline; 31.5% of it distilled over at 477° F. under 15 mm. of mercury absolute pressure; it was free of ash and asphalty or tarry materials, and was consequently a highly desirable charge or cracking stock for a subsequent catalytic or thermal operation, indicated at D in Fig. 1. The contact mass had accumulated a deposit of 26.36% of its weight or 0.1% by weight of the charge. From the regenerating operation, any valuable components of the deposit are rendered available for recovery by known methods.

From the above it will be apparent that the present invention provides convenient and efficient means for converting hydrocarbon residues into clean vapor phase material suitable as charge to other treating and converting operations, and that the clean dry hydrocarbon vapors may be supplied directly to such a treatment or conversion zone at any suitable elevated temperature. All of the non-volatile material, even extremely small amounts of which are known to cause trouble in both catalytic and pyrolytic conversion apparatus is separated from the volatile and valuable portions of a hydrocarbon residue. Hence, from hydrocarbon residues, which ordinarily present problems of disposal, or, at the most, are suitable for low grade fuels, there is produced, by a simple and inexpensive operation, a valuable hydrocarbon material having distillate characteristics. Further, certain valuable components of the non-volatile portions are made available for recovery.

I claim as my invention:

1. In the treatment of heavy hydrocarbons to produce valuable products therefrom, the process steps comprising heating a stream of heavy hydrocarbons to cracking temperature under such conditions of rate and pressure that said stream is largely vaporized but no substantial conversion of heavy hydrocarbons into lower boiling hydrocarbons of the gasoline type is effected, passing a stream of the heated hydrocarbons containing unvaporized material through two serially connected separation zones maintained at temperatures within the range suitable for substantial cracking at such rate that substantially no lower boiling hydrocarbons of the gasoline type are formed, within the first of said zones separating the bulk of said unvaporized material from said vapors, within the second of said zones, separating unvaporized entrainment from hydrocarbon vapors to leave a stream of clean, dry vapor substantially free of components of the gasoline type at a temperature conducive to substantial transformation thereof into lower boiling hydrocarbons of the gasoline type, and feeding said last named stream while still at substantially the temperature of the second separation zone to a cracking or transformation zone containing an adsorptive contact mass capable of promoting the formation of high anti-knock motor fuel of the gasoline type and maintained under cracking conditions.

2. In the treatment of heavy hydrocarbons to produce valuable products therefrom, the process steps comprising heating a stream of heavy hydrocarbons to cracking temperature under such conditions of rate and pressure that said stream is largely vaporized but no substantial conversion of heavy hydrocarbons into lower boiling hydrocarbons of the gasoline type is effected, passing a stream of the heated hydrocarbons through two serially connected separation zones maintained at cracking temperature, maintaining within the second of said separating zones a bed of contact material capable of separating entrained material from vapor and of retaining the separated material, withdrawing unvaporized material from the first of said zones, maintaining said contact material at approximately the temperature of said first zone whereby substantially no condensation takes place therein and a stream of heavy hydrocarbon vapor issues therefrom at a temperature conducive to substantial transformation of said vapor into lower boiling hydrocarbons of the gasoline type, and feeding said vapor while still at substantially the temperature of said mass to a cracking zone containing an adsorptive silicious contact mass capable of promoting the transformation of higher boiling hydrocarbons into anti-knock products of the gasoline type and maintained under cracking conditions.

3. In the production of valuable distillates from heavy hydrocarbons, the process comprising heating a stream of heavy hydrocarbons to a temperature suitable for substantial cracking of the heavy hydrocarbon charge into lower boiling products within the range of 810° to 990° F. under such conditions of rate and pressure that said stream is largely vaporized without producing substantial amounts of lower boiling hydrocarbons of the gasoline type, separating the resulting mixture of vapor and unvaporized material into a substantially vaporous fraction and an unvaporized fraction while maintaining the aforesaid mixture at approximately said vaporization temperature, passing said vaporous fraction through a layer of contact material capable of separating entrained material from the vapors while permitting passage of vapors, maintaining said contact material at substantially the temperature of said first separation, and feeding the stream of vapors issuing from said contact material while still at substantially said vaporization temperature to a transformation or conversion zone containing an adsorptive contact mass capable of promoting cracking reactions and maintained under conditions conducive to the production from said vapors of substantial amounts of lower boiling hydrocarbons of the gasoline type.

4. In the production of valuable distillates from heavy hydrocarbons, the process comprising heating a stream of heavy hydrocarbons to a temperature suitable for cracking and above 860° F. under such conditions of rate and pressure that said stream is largely vaporized but substantially no conversion thereof into gasoline type products is effected, passing a stream of the heated hydrocarbons containing unvaporized material through two serially connected separation zones maintained at cracking temperature, within the first of said zones separating the bulk of said unvaporized material from vapors, passing the resulting substantially vaporous stream through a contact mass capable of separating entrainment from said vapors and maintained in the second of said zones, and passing the resulting stream of clean dry vapor at substantially the temperature of said mass and without addition of heat into a conversion zone maintained at a temperature not exceeding that of the entering oil vapors.

5. In the production of valuable distillates from heavy hydrocarbons, the process comprising heating a stream of heavy hydrocarbons to a temperature within the range of 860° to 990° F. under such conditions of rate and pressure that said stream is largely vaporized but substantially no conversion into gasoline type products is effected, passing a stream of the heated hydrocarbons containing unvaporized material through two serially connected separation zones maintained at temperature within the range suitable for substantial cracking at such rate as to minimize the formation of lower boiling hydrocarbons of the gasoline type, within the first of said zones separating the bulk of said unvaporized material from said vapors, within the second of said zones separating unvaporized entrainment from hydrocarbon vapor to leave a stream of clean, dry higher boiling hydrocarbon vapor, and feeding the said last named stream while still at substantially the temperature of the second separation zone to a cracking or transformation zone maintained at a temperature not exceeding that of the entering oil vapors.

6. In the treatment of heavy hydrocarbons to produce therefrom a clean material having distillate characteristics, the process of charging a stream of the heavy hydrocarbons to a heated zone to produce a mixture of vaporous hydrocarbons and unvaporized material, feeding said mixture to a primary separation zone to effect removal of a portion of said unvaporized material, withdrawing a stream of substantially vaporous hydrocarbons from said separation zone, passing said stream of vaporous hydrocarbons without substantial reduction of temperature into and through a secondary separation zone containing a bed of contact material capable of removing solids and entrained liquid from said stream, and admitting a controlled amount of fluid containing free oxygen to the stream of hydrocarbon vapors leaving said primary separation zone and entering said secondary separation zone to effect combustion of a portion of said stream.

7. In apparatus for preparing a stream of clean vaporous hydrocarbons from heavy hydrocarbons, in combination, a heater for receiving heavy hydrocarbons and producing a mixture of vapor and unvaporized material therefrom, a separating vessel containing upper and lower chambers, a bed of filtering material in said upper chamber, said vessel providing a side inlet connection for admitting said mixture to said lower chamber, an outlet connection for venting vapors from said upper chamber, a draw-off connection for unvaporized material, a duct extending within said lower chamber for conducting fluid therefrom to said upper chamber, a conduit connecting said inlet and said heater, and means in said lower chamber for admitting a controlled amount of air to said duct.

8. In apparatus for effecting separation of unvaporized materials from a mixture of vaporous and unvaporized material, in combination, a vessel providing two separation zones in superposed relation, a perforated partition defining the upper end of the first zone and the lower end of the second zone, a contact mass in said second zone, an inlet to said first zone for mixtures of vapors and unvaporized material arranged to admit said mixture substantially tangentially to the periphery of said first zone, means including a duct located within said first zone for conducting vapors and entrained unvaporized material from said first zone to said second zone, a connection for venting vapors from said second zone, means adapted for periodic admission of regenerating medium to said second zone, and means for venting spent regenerating medium from said first zone.

9. In apparatus for effecting separation of unvaporized materials from a mixture of vaporous and unvaporized material, a vessel providing two separation zones in superposed relation, a perforated partition defining the upper end of the first zone and the lower end of the second zone, a contact mass in said second zone, an inlet to said first zone for mixtures of vapors and unvaporized material arranged to admit said mixture substantially tangentially to the periphery of said first zone, means including a duct located within said first zone for conducting vapors and entrained unvaporized material from said first zone to said second zone, a connection in the upper portion of said vessel adapted for use alternately in venting vapors from and admitting regenerating medium to said second zone, and a connection in the lower portion of said vessel adapted for use alternately in venting unvaporized material and spent regenerating medium from said first zone.

10. In apparatus for effecting separation of unvaporized materials from a mixture of vaporous hydrocarbons and unvaporized material, a vessel providing two separation zones in superposed and fluid communicating relation through a short passageway, a partition defining the upper limit of the first zone and the lower end of the second zone, a contact mass in said second zone, an inlet connection in a side wall of said first zone for admitting thereto a mixture of vaporous hydrocarbons and unvaporized material, a connection below said inlet connection for withdrawing unvaporized material from said first zone, means including a duct within said first zone for conducting a stream of vapors and entrained unvaporized material from said first zone to said second zone, a conduit connected to said duct for admitting a controlled amount of fluid containing free oxygen to the latter, and an outlet connection for vapors in the upper portion of said second zone.

EUGENE J. HOUDRY.

CERTIFICATE OF CORRECTION.

Patent No. 2,187,741.  January 23, 1940.

EUGENE J. HOUDRY.

It is hereby certified that error appears in the printed specification of the above numbered patent requiring correction as follows: Page 2, second column, line 18, for the reference character "12a" read 28a; page 3, second column, line 25, for "26.7%" read 26.7°; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.